3,143,417
LIGHT SENSITIVE COATINGS FOR SCREEN PRINTING CONTAINING N-ALKOXYMETHYLATED POLY-ε-CAPROLACTAM
Maximilian Karl Reichel and Wilhelm Neugebauer, Wiesbaden-Biebrich, Germany, assignors, by mesne assignments, to Azoplate Corporation, Murray Hill, N.J., a corporation of New Jersey
No Drawing. Filed Sept. 21, 1960, Ser. No. 57,415
Claims priority, application Germany Oct. 2, 1959
19 Claims. (Cl. 96—35)

The present invention relates to reproduction coatings for screen printing consisting, basically, of N-alkoxymethylated poly-ε-caprolactam which has been rendered light-sensitive with bichromate or certain azides.

In the screen-printing process, stencils are used which normally consist of a porous support over which there is a coating in the non-printing portions so that when the stencil is placed on the article to be printed, and the coloring matter applied, only the image portions print through the porous support.

For the preparation of the screen-printing stencils, the porous support is provided with a light-sensitive coating. When the coating is exposed to light, the portions struck by the light become tanned and therefore insoluble, while the portions not struck by light can be readily removed by washing with a solvent, such as water.

The supports used are porous materials such as paper, Japanese fiber paper or tissues made of glass fiber, natural or synthetic textile fiber or metal filaments.

Light-sensitive coatings used heretofore include water-soluble natural colloids, e.g., gelatine, fish glue, casein and synthetic water-soluble polymers such as polyvinyl alcohol, polyvinyl pyrrolidone, polyacrylic acid and polyacrylic acid amides, to which bichromate or aromatic azido compounds have been added to confer light-sensitivity. These coatings have poor mechanical strength and require an after treatment if they are to be made suitable for industrial use.

Attempts have also been made to prepare screen printing stencils of greater mechanical stability by the use of synthetic polyamide mixed condensates produced by mutual polycondensation of a number of monomeric reaction components, e.g., at least one ω,ω'-dicarboxylic acid, an equal quantity of at least one ω,ω'-diamine and at least one ω-aminocarboxylic acid, the proportion of ω-aminocarboxylic acid in the polycondensate being 20–50 percent, preferably 20–40 percent by weight. These mixed condensates have not proved acceptable in practice because they are soluble only in alcohol heated to at least 55–65° C. Involving as it does the use of so hot a volatile solvent, the development of the screen-printing stencils after exposure thereof to light is accompanied by such large quantities of vapors of a noxious and inflammable nature that safe working conditions are not possible. Moreover, the complete removal of those portions of the coating not struck by light can, in practice, be effected only with difficulty.

The use of pure polyamides, such as poly-ε-caprolactam and polyadipic acid hexamethylene diamine is excluded owing to the insolubility thereof.

Light-sensitive coatings for screen printing have now been found which contain at least one polyamide and contain, as polyamide, N-alkoxy-methylated poly-ε-caprolactam and/or partially depolymerized N-alkoxy-methylated poly-ε-caprolactam, both of which are soluble in cold solvents.

The starting material used for the preparation of the N-alkoxy-methylated poly-ε-caprolactam of the invention is a commercial poly-ε-caprolactam with a K-value of 63–69 (K value after Fikentscher, see W. Schäfer, Einfürung in das Kunststoffgebiet, Akademische Verlagsgesellschaft, Leipzig (1951), p. 104) and an intrinsic viscosity ($\eta$) of 0.50 to 1.0, preferably 0.65 to 0.85.

The N-alkoxymethylated products have 20–50 percent, preferably 25–40 percent of the carboxylic acid amide groups of the poly-ε-caprolactam replaced by alkoxymethyl groups. The K-value and the intrinsic viscosity nevertheless remain essentially the same as in the starting product.

The N-alkoxymethylated poly-ε-caprolactam may be obtained from a partially depolymerized poly-ε-caprolactam.

Thus, the poly-ε-caprolactam can be obtained prior to N-alkoxymethylation by treatment with water under pressure at over 200° C. or by heating under reflux to 85–95° C. with a mixture of ethyl alcohol and a mineral acid. In this way, products can be prepared that have a K-value of about 30 to 35 and an intrinsic viscosity ($\eta$) of 0.15 to 0.21 and are 20–50 percent, preferably 25–40 percent, N-alkoxymethylated on the acid amide group.

The N-alkoxymethylation of the poly-ε-caprolactam is preferably performed as follows:

100 parts by weight of poly-ε-caprolactam are dissolved in a mixture of 300 parts, by volume, of glacial acetic acid and 75 parts, by volume, of 90 percent formic acid, on a steam bath. A hot-filtered solution of 100 parts by weight of paraformaldehyde in 250 parts by volume of methanol is then slowly introduced, dropwise with stirring, at 70–80° C. Stirring is then continued for four hours at 70° C., after which the reaction mixture is cooled to 55–60° C. and introduced fairly quickly, with vigorous stirring, into an excess of a 5 percent ammonia solution, to which up to 20 percent of acetone may be added to ensure uniform precipitation of the N-alkoxy-methylated product. The precipitated reaction product is separated by suction filtration, washed a number of times with water and dried under mild conditions. The yield of N-methoxymethylated poly-ε-caprolactam is nearly quantitative based upon the starting material. Ethyl, allyl or propyl alcohol can be used instead of methanol for the N-alkoxymethylation with the same results. With an equally high degree of N-alkoxymethylation, the physical and chemical properties, when these alcohols are used, correspond largely to those of the products obtained with methanol. Also, mixtures of products which differ, e.g., in respect of the alkoxy group, the degree of alkoxymethylation, the K-value or the viscosity, may be used.

The N-alkoxymethylation products are soluble in mixtures of water and alcohol, the degree of solubility being a function of the degree of N-alkoxymethylation. This, in turn, is dependent on the proportion of formaldehyde to poly-ε-caprolactam used. With ratios up to one part by weight of poly-ε-caprolactam to 0.5 part by weight of paraformaldehyde, solution of the resultant reaction product in 60 percent aqueous alcohol at 55–65° C. is not complete. If, however, 0.7 part by weight of paraformaldehyde to one part by weight of the polyamide is used, products that are completely soluble in 60 percent ethyl alcohol at 50–65° C. are obtained. N-alkoxymethylation products that are completely soluble in 60 percent alcohol at room temperature are obtained if, to each part by weight of poly-ε-caprolactam used in the reaction, 0.8 to 1.2 parts by weight of paraformaldehyde are used.

A partially depolymerized N-alkoxy methylated poly-ε-caprolactam is obtained as follows: 30 parts by weight of the poly-ε-caprolactam specified above (K-value=63–69; intrinsic viscosity ($\eta$)=0.65–0.85) are dissolved in a mixture of 150 parts by volume of 90 percent formic acid, 50 parts by volume of concentrated hydrochloric acid (or 20 parts by volume of concentrated sulfuric acid) and 100 parts by volume of methyl alcohol on a steam bath during a period of one hour. The reaction mixture, after being cooled to 50–60° C., is stirred moderately quickly into an excess of a 5 percent aqueous ammonia solution. To this may be added up to 20 percent of acetone to ensure uniform precipitation of the polyamide; the substituted polyamide precipitates out in the form of white flakes. Stirring is continued at room temperature for one hour to ensure complete precipitation and the reaction product is then separated by suction filtration, washed neutral with water and dried in the air. The yield of partially depolymerized N-alkoxymethylated poly-ε-caprolactam based upon the starting material is nearly quantitative. The product has a K-value of 30–35 and an intrinsic viscosity ($\eta$) of 0.15–0.21.

For the preparation of the light-sensitive coatings for screen printing, an approximately 7.5 to 10 percent solution, depending upon the type of porous support employed, of N-alkoxymethylated poly-ε-caprolactam, or partial depolymerization product thereof, is used. When 80–90 percent ethyl alcohol is used, the solutions have a viscosity at 23° C. of 29–53 centipoises by the Ubbelhode-Holde method of measurement.

The porous support is coated with the solution in manner known per se and the solvent is evaporated. So that the N-alkoxy-methylated poly-ε-caprolactam will have the property of becoming insoluble when exposed to light, either bichromates, such as ammonium bichromate, or p-azidostyryl-benzene compounds, or p-azido-styryl-ketones or light-sensitive diazonium salts soluble in organic solvents, such as diazonium borofluorides, are added thereto. Also, mixtures of such compounds can be used provided they are compatible. These sensitizing compounds are added to the polyamide in proportions of about 1:4 to about 1:10 based upon the dry weight of substituted polyamide.

The screen printing stencils provided with the light-sensitive coatings and exposed to light under a master are treated with aqueous alcohol, e.g. 60–80 percent ethyl alcohol, at room temperature, to remove the unexposed portions of the coating. Alcohol and water mixtures containing less than 40 percent of alcohol are less satisfactory. The alcohol may be denatured or, instead of ethyl alcohol, other lower aliphatic alcohols, e.g., methyl, propyl or isobutyl alcohol, may be used. They are mixed with water in the same proporitons as with ethyl alcohol. As supports, the porous base materials already described which are normally used in screen printing and film printing can be employed.

Aromatic azido compounds suitable for the sensitization are described in German Patent No. 752,852, and in German Patent No. 954,308. They are products, the molecules of which contain at least one azido group and in para position thereto a vinyl group or a substituted vinyl group. These products have the following general formula

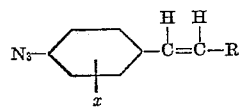

in which R is an aliphatic, aromatic or heterocyclic radical, e.g.,

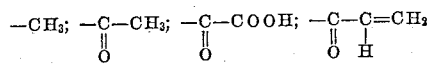

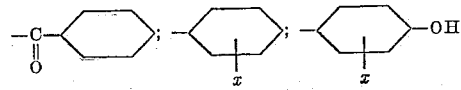

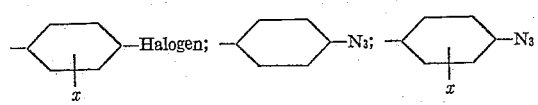

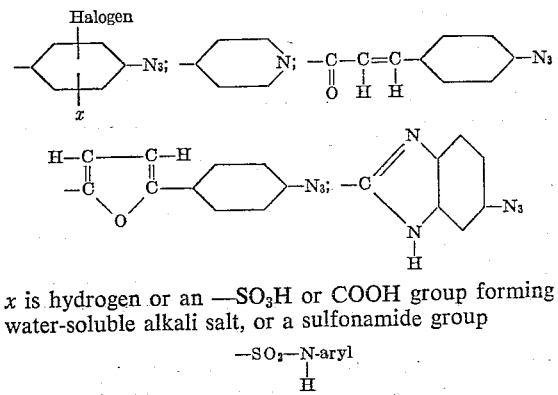

$x$ is hydrogen or an —SO$_3$H or COOH group forming a water-soluble alkali salt, or a sulfonamide group

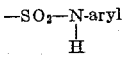

in which the aryl portion may be substituted. A hydrogen of the vinyl group may be replaced by an alkyl or a carboxyl group.

Exemplary compounds which are within the scope of the general formula given above and which are suitable for the hardening of the partially N-alkoxymethylated poly-ε-caprolactam are:

FORMULA 1

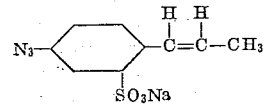

FORMULA 2

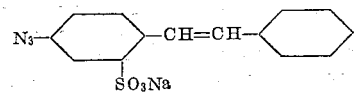

FORMULA 3

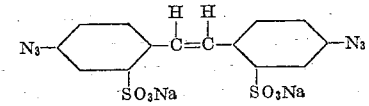

FORMULA 4

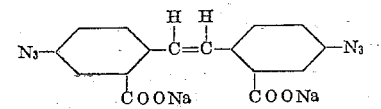

FORMULA 5

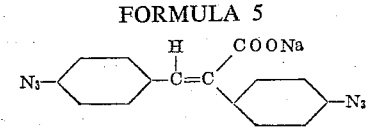

FORMULA 6

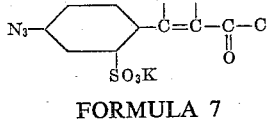

FORMULA 7

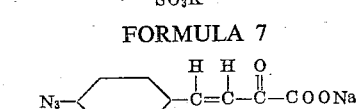

FORMULA 8

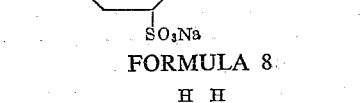

FORMULA 9

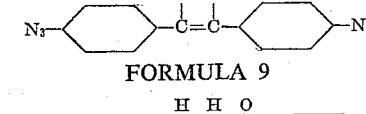

FORMULA 10
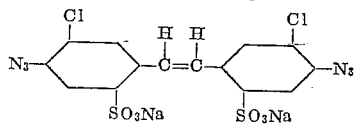

FORMULA 20
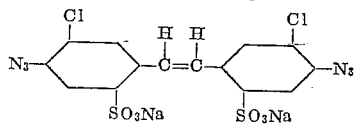

FORMULA 21
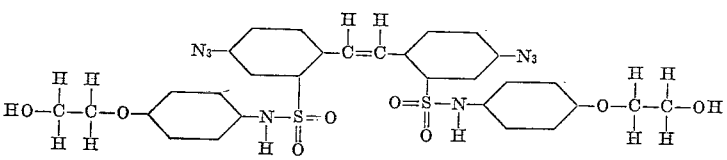

FORMULA 11
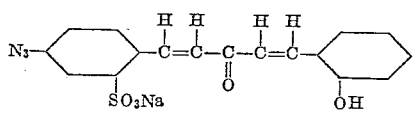

FORMULA 12
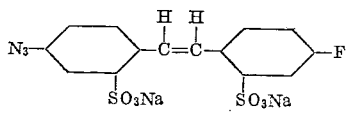

FORMULA 13
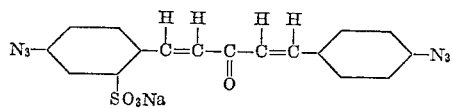

FORMULA 14
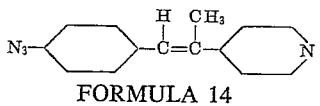

FORMULA 15
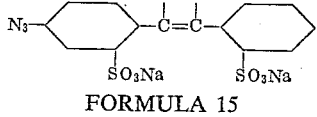

FORMULA 16
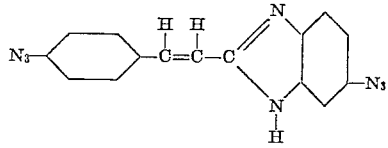

FORMULA 17
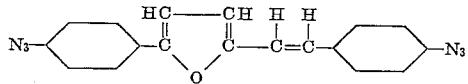

FORMULA 18
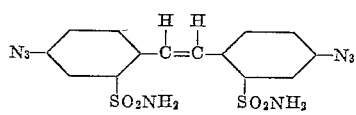

FORMULA 19
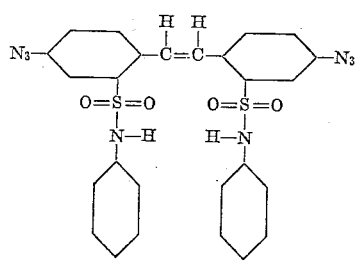

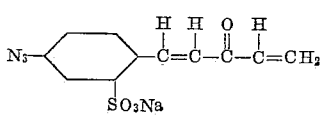

4-azido-1-ω-methyl-styryl-2-sulfonic acid sodium salt, corresponding to Formula 1, is prepared by the Meerwein method (Journal für praktische Chemie, vol. 152 (1939), pages 237–266) by condensation of crotonic acid with diazotized 4-nitro-aniline-2-sulfonic acid in the presence of cupric chloride and acetone, catalytic reduction of the nitrostyryl compound to the 4-aminostyryl compound, diazotization of the latter and, finally, conversion by means of sodium azide;

4-azido-1-ω-phenyl-styryl-2-sulfonic acid sodium salt, corresponding to Formula 2, is prepared by the process described in the Journal für praktische Chemie, vol. 152 (1939), pages 237–266. Instead of crotonic acid, cinnamic acid is used;

4,4'-diazidostilbene-2,2'-disulfonic acid sodium salt, corresponding to Formula 3;

4,4'-diazidostilbene-2,2'-dicarboxylic acid sodium salt, corresponding to Formula 4;

4,4'-diazidostilbene-α-carboxylic acid sodium salt, corresponding to Formula 5;

4-azido-benzalacetone-2-sulfonic acid sodium salt, corresponding to Formula 6;

Disodium salt of 4-azidobenzal-pyroracemic acid-2-sulfonic acid, corresponding to Formula 7;

4,4'-diazidostilbene, corresponding to Formula 8; is prepared by catalytic reduction of the dinitro compound to the diamino compound, tetrazotization of the diamino compound and conversion of the tetrazo compound with sodium azide;

4-azidobenzal-acetophenone-2-sulfonic acid sodium salt, corresponding to Formula 9;

4-azido-2'-hydroxy-dibenzalacetone-2-sulfonic acid sodium salt, corresponding to Formula 10;

4-azido-4'-fluorostilbene-2,2'-disulfonic acid sodium salt, corresponding to Formula 11, is prepared by thermal decomposition of the diazonium borofluoride of 4-nitro-4'-aminostilbene-2,2'-disulfonic acid, catalytic reduction, diazotization and conversion with sodium azide;

4,4'-diazido-bis-(styryl-ketone)-2-sulfonic acid sodium salt, corresponding to Formula 12, is prepared by the condensation of 4-azido-benzaldehyde-2-sulfonic acid sodium salt with 4-azido-benzal-acetone, in a manner analogous to that described in German Patent No. 752,852;

4-(4'-azido-β-methyl styryl)-pyridine, corresponding to Formula 13, is prepared by the condensation of 4-nitrobenzaldehyde with ethyl pyridine by the process described in "The Journal of the American Chemical Society," vol. 76 (1952), p. 3986–3987, catalytic reduction of the nitro compound to the amino derivative, diazotization of the latter, followed by conversion with sodium azide.

4-azidostilbene-2,2'-disulphonic acid sodium salt, corresponding to Formula 14, is prepared from 4-nitro-4'-aminostilbene-2,2'-disulfonic acid by diazotization, boiling of the diazo compound with absolute alcohol, reduction of the nitrostyryl compound, diazotization of the amino group and final conversion with sodium azide;

2-(4'-azidostyryl)-6-azido-benzimidazole, corresponding to Formula 15, is prepared by condensation of 4-nitrobenzaldehyde with 2-methyl-5(6)-nitrobenzimidazole, catalytic reduction of the dinitro compound to the diamino compound, tetrazotization and final conversion with sodium azide;

5-(4'-azidophenyl)-2-(4"-azidostyryl)-furan, corresponding to Formula 16, is prepared by a process analogous to that described in Example 1, cinnamic acid being used, by condensation of furyl acylic acid with two moles of diazotized p-nitraniline, catalytic reduction of the dinitro compound to the diamino compound, tetrazotization and conversion of the tetrazo compound with sodium azide;

4,4'-diazidostilbene-2,2'-disulfonamide, corresponding to Formula 17, is prepared from 4,4'-dinitrostilbene-2,2'-disulfonyl chloride by reaction with ammonia, reduction of the nitro groups to amino groups, tetrazotization and conversion with sodium azide;

4,4'-diazidostilbene-2,2'-bis-sulfanilide, corresponding to Formula 18, is prepared by condensation of 4,4'-dinitrostilbene-2,2'-disulfonyl chloride with aniline, catalytic reduction of the dinitro compound, tetrazotization and reaction with sodium azide;

4-azidobenzal-methyl-vinyl-ketone-2-sulfonic acid sodium salt, corresponding to Formula 19, is prepared by a process analogous to that described in German Patent No. 752,852, by condensation of 4-azido-2-benzaldehyde-sulfonic acid sodium salt with methyl-vinyl-ketone.

4,4'-diazido-5,5'-dichlorostilbene-2,2'-disulfonic acid sodium salt, corresponding to Formula 20, is prepared from 4,4'-dinitro-5,5'-dichlorostilbene-2,2'-disulfonic acid sodium salt by catalytic reduction, tetrazotization and reaction with sodium azide;

4,4'-diazidostilbene-2,2'-bis-(sulfonamido-4"-phenyl-hydroxyethylether), corresponding to Formula 21, is prepared by condensation of 1 mole of 4,4'-diazidostilbene-2,2'-disulfonyl chloride with 2 moles of β-hydroxy-p-phenetidine.

Provided with hardened polyamide coatings and resistant even to boiling water, the screen-printing stencils obtained by the present invention may, in the interest of improved visibility, be inked up with dyestuffs up to quantities amounting to 0.1 to 0.5 percent. In particular, dyestuffs which absorb ultraviolet light only slightly are used, e.g., Methyl Violet BB (Schultz' Farbstofftabellen, 7th edition, vol. 1 (1931), p. 327, No. 783), Patent Blue V (ibid. p. 349, No. 826), Rosaniline Hydrochloride (ibid., p. 324, No. 780) or New Fuchsin (ibid., p. 326, No. 782). The screen-printing stencils are not attacked by inking pastes with a high caustic content, so that Naphthol AS dyestuffs may be used in screen and film printing. Moreover, they are resistant to the most common solvents such as acetone, ether, ethyl acetate, butyl acetate, glycols, benzene and its homologues, and also chlorinated hydrocarbons. Thus, it is possible for classes of coloring materials and coloring processes to be used which can not be used with tanned coatings consisting of water-soluble products such as gelatine, polyvinyl alcohol, and the like.

Moreover, the coatings of the invention, if sensitized with aromatic azido compounds, have an advantage over coatings hitherto known in that they keep well and can be stored in a sensitized state. Further, adherence of the tanned layer to the porous support is excellent even without any precoating. Because of the excellent storing qualities and the mechanical and chemical resistance of the coatings, it is possible for mass production work to be carried out therewith, in particular in mechanical film printing, even where aqueous caustic alkaline inks, e.g. Napthol AS dyestuffs, are used and in the coloring of ceramic and glassware, in which glycerine, oil, water and caustic pastes are used. The coatings, although extremely thin, are extraordinarily strong and enable a very fine application of color to be made so that much less coloring material is required. It is, consequently, possible for the finest details of the stencil to be copied by direct printing without distortion—a factor which proves particularly valuable in multicolor screen and film printing, in particular in the case of gold coloring work in the ceramic and glass industries. The coatings of the invention are suitable for office duplicating work as well as for film and screen printing.

The invention will be further illustrated by reference to the following specific examples:

*Example 1*

A solution of 2.5 parts by weight of 4,4'-diazidostilbene-2,2'-disulfonic acid sodium salt in 10 parts by volume of 50 percent aqueous ethyleneglycol monomethylether is added, with stirring, to 90 parts by volume of a 10 percent solution, prepared with 80 percent ethyl alcohol, of an N-methoxymethyl poly-ε-caprolactam, with a K-value of 63.2, corresponding to an intrinsic viscosity ($\eta$) of 0.65 and a methoxy content of 7.5–8 percent, corresponding to 38–40 percent of substituted carboxylic acid amide groups. The light-sensitive solution, after being cooled to room temperature, is coated, either by a simple immersion and draining process or by means of a spray gun upon the material suitable for screen-printing stencils serving as the support, e.g., Japanese-fiber paper, textile fabric made of synthetic polyamide or synthetic polyester, pure silk or artificial silk, woven glass fiber or woven metal e.g., copper-bronze or stainless steel, and drying is effected at 90–100° C. This material, which in the light-sensitive condition has, for all practical purposes, almost unlimited shelf-life and is unaffected by normal variations in humidity and temperature, is exposed to light under a transparent master. The length of exposure depends on the type of master and the light source used. If very fine detail is present in the master, it may be an advantage for arc lamps to be used, so that light diffusion effects are avoided. If an 18-amp. enclosed carbon arc lamp is used at a distance of 50–70 cm., a tanned image is formed in about one to two minutes. However, it can be an advantage for the exposure to be prolonged somewhat, e.g., until the material takes on a yellow-brown or red-brown color, which will occur in about 2.5 to 5 minutes. The exposed material is then placed in 60–80 percent ethyl alcohol at a temperature of about 20° C., so that the portions of the coating not struck by light are dissolved away. It is recommended that the treatment with 60–80 percent ethyl alcohol at room temperature be repeated once or twice so that any non-hardened polyamide that may still be clinging to the support is removed.

For the removal of these portions of the polyamide coating not struck by light and hence untanned, other alcohols such as methyl alcohol or propyl alcohol may be used with equal success in place of the ethyl alcohol; the mixture thereof with water being in the same proportions. Alcoholic mixtures with less than 40 percent of alcohol are not so suitable for the preparation of the tanned images for stencils.

The stencils produced in this simple manner are excellently suited for prolonged use in screen printing and film printing as also for office duplicating purposes. Because of the outstanding resistance and elasticity thereof when subjected to the highest degree of mechanical stress, it is possible for screen printing and film printing processes to be mechanized and for direct printing on objects with round or oval surfaces, e.g., wineglasses, to be performed for the first time.

*Example 2*

The coating of a porous support is performed as described in Example 1 except that a solution of 2.5 parts by weight of ammonium bichromate in 10 parts by volume of distilled water is used instead of the solution of 2.5 parts by weight of 4,4'-diazidostilbene-2,2'-disulfonic acid sodium salt and the coated light-sensitive solution is dried at temperatures below 40° C. A stencil very suitable for screen printing and film printing and also for office duplicating purposes is obtained.

Example 3

A screen-printing stencil is obtained by the procedure described in Example 1, but, instead of the polyamide described in Example 1, a partially ethoxymethylated poly-ε-caprolactam is used which is obtained by the action of paraformaldehyde and ethyl alcohol on poly-ε-caprolactam and has an ethoxy group content of 7.5–8 percent, a K-value of 63 and an intrinsic viscosity ($\eta$) of 0.65. If, in the alkoxy methylation of the poly-ε-caprolactam, n-propyl alcohol or allyl alcohol is used instead of ethyl alcohol, products are obtained which can be used with equal success for the formation of the light-sensitive coating and hence for the preparation of the stencils. In these cases, a partially N-propoxy-methylated and a partially N-propene-oxy-methylated poly-ε-caprolactam are respectively obtained which are excellently suited for light-sensitive coatings for the preparation of stencils on porous supports.

Example 4

The procedure used in Examples 1, 2 and 3 is followed but, instead of the partially N-alkoxy-alkylated poly-ε-caprolactam, a partially depolymerized, partially N-methoxy-methylated poly-ε-caprolactam with a K-value of 35, an intrinsic viscosity ($\eta$) of 0.21 and a methoxy group content of 7.5–8 percent is used. After the polyamide layer has been applied to the porous support, dried and exposed to light under a diapositive, those portions of the coating not struck by light are removed with 60–80 percent ethyl alcohol at room temperature and a highly resistant stencil for screen printing or film printing or for office duplicating purposes is obtained.

Example 5

2 parts by weight of the diazoborofluoride of p-amino-diphenylamine dissolved in 20 parts by weight of ethyleneglycol monomethylether are added, with slight heating, (to about 50° C.) to 80 parts by volume of a 10 percent solution, prepared with 80 percent ethyl alcohol, of an N-methoxy-methyl-poly-ε-caprolactam with a degree of polymerization represented by a K-value of 63.2, an intrinsic viscosity ($\eta$) of 0.65 and a methoxy group content of 7.5–8 percent. The light-sensitive solution is coated at room temperature upon the material serving as support, e.g., textile fabric made of a synthetic polyamide, or polyester such as polyethylene glycol terephthalic acid ester, by a process of immersion, draining and doctoring with a rigid sheet of, e.g., Astralon foil, dried at room temperature and exposed to light under a suitable diapositive. If an enclosed 18-amp carbon arc lamp is used at a distance of 50–70 cm. as the light source, an exposure of about 8–10 minutes produces an altered, cross-linked polyamide, as a result of the liberation of hydrofluoboric acid from the diazo borofluoride decomposed under the influence of light, and the consequent splitting off of the methoxy group. In comparison with N-methoxy methyl-poly-ε-caprolactam, this product is characterized by very great resistance to dilute mineral acids, such as hydrochloric acid. For the removal of those portions of the coating not struck by light, the surface is treated with 60–80 percent ethyl alcohol at room temperature. It is advantageous for this treatment with 60–80 percent ethyl alcohol to be repeated once or twice so that any polyamide still clinging to the support is removed. Instead of ethyl alcohol, other aliphatic alcohols, such as methyl or isopropyl alcohol, may be used, the proportions for mixture with water being the same.

Stencils obtained by this process are very suitable for long runs in screen and film printing and in particular for direct printing with pastes containing hydrofluoric acid for the etching of glass. Instead of the diazo borofluoride of p-amino-diphenylamine, two parts by weight of the tetrazo-borofluoride of 4,4'-diaminostilbene dissolved in 20 parts by volume of dimethyl formamide may be used.

Example 6

In the light-sensitive polyamide coating solutions described in Examples 1–4 above, the ammonium bichromate or 4,4'-diazidostilbene-2,2'-disulfonic acid sodium salt is replaced by one of the following azido compounds in the quantity stated:

2.5 parts by weight of 4-azidobenzalacetone-2-sulfonic acid potassium salt, corresponding to Formula 6, 1.0 part by weight of 4,4'-diazidostilbene, corresponding to Formula 8, 1.0 part by weight of 4-(4'-azido-β-methyl-styryl)-pyridine, corresponding to Formula 13, 2.5 parts by weight of 2-(4'-azidostyryl)-6-azido-benzimidazole, corresponding to Formula 15, 2.5 parts by weight of 4-azidostilbene-2,2'-disulfonic acid sodium salt, corresponding to Formula 14, 2.5 parts by weight of 4,4'-diazido-5,5'-dichlorostilbene-2,2'-disulfonic acid sodium salt, corresponding to Formula 20, 2.5 parts by weight of 4-azido-ω-methyl-styryl-2-sulfonic acid sodium salt, corresponding to Formula 1, 2.5 parts by weight of 4-azido-ω-phenyl-styryl-2-sulfonic acid sodium salt, corresponding to Formula 2, 2.5 parts by weight of 5-(4'-azidophenyl)-2-(4''-azido-styryl)-furan, corresponding to Formula 16, 2.0 parts by weight of 4,4'-diazidostilbene-2,2'-bis-(sulfonamido-4''-phenyl-hydroxyethyl-ether), corresponding to Formula 21, 2.0 parts by weight of 4,4'-diazidostilbene-2,2'-bis-sulfonamide, corresponding to Formula 17, or 2.0 parts by weight of 4,4'-diazidostilbene-2,2'-bis-sulfanilide, corresponding to Formula 18.

The light-sensitive material obtained with these coating solutions, by the procedure described in Example 1, is also suitable for the preparation of stencils for screen printing and film printing, also for office duplicating purposes; it gives good results.

It will be obvious to those skilled in the art that many modifications may be made within the scope of the present invention without departing from the spirit thereof, and the invention includes all such modifications.

What is claimed is:

1. Light sensitive material comprising a porous base material having a coating thereon comprising a light sensitive compound capable of rendering the coating insoluble in aqueous alcohol upon exposure to light and an N-alkoxymethylated poly-ε-caprolactam.

2. Light sensitive material according to claim 1 in which the caprolactam is soluble in aqueous alcohol at low temperatures.

3. Light sensitive material according to claim 1 in which the N-alkoxymethylated poly-ε-caprolactam has a K-value of about 63 to 69, an intrinsic viscosity of about 0.5 to 1.0, and in which about 20 to 50 percent of the carbonamide groups thereof are substituted.

4. Light sensitive material according to claim 1 in which the N-alkoxymethylated poly-ε-caprolactam is a partially depolymerized N-alkoxymethylated poly-ε-caprolactam having a K-value of about 30 to 35, an intrinsic viscosity of about 0.15 to 0.21, and in which about 20 to 50 percent of the carbonamide groups thereof are substituted.

5. Light sensitive material according to claim 1 in which the light sensitive compound is a bichromate.

6. Light sensitive material according to claim 1 in which the light sensitive compound is a light sensitive diazonium salt soluble in organic solvents.

7. Light sensitive material according to claim 1 in which the light sensitive compound is a diazo borofluoride.

8. Light sensitive material according to claim 1 in which the light sensitive compound is an aryl azido compound.

9. Light sensitive material according to claim 1 in which the light sensitive compound has the formula

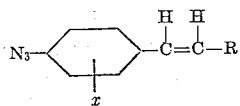

in which R is selected from the group consisting of aliphatic, aromatic and heterocyclic radicals and $x$ is selected from the group consisting of hydrogen, a water-soluble alkali salt-forming group, and —$SO_2$—NH—$R_1$, in which $R_1$ is an aryl group.

10. A process for making screen printing stencils which comprises exposing a coated porous base material to light under a master, the coating comprising a light sensitive compound capable of rendering the coating insoluble in aqueous alcohol upon exposure to light and an N-alkoxymethylated poly-ε-caprolactam, and treating the exposed coating with a solvent, whereby the non-light struck portions thereof are removed.

11. A process according to claim 10 in which the solvent is an aqueous alcohol.

12. A process according to claim 10 in which the caprolactam is soluble at low temperatures.

13. A process according to claim 10 in which the N-alkoxymethylated poly-ε-caprolactam has a K-value of about 63 to 69, an intrinsic viscosity of about 0.5 to 1.0, and in which about 20 to 50 percent of the carbonamide groups thereof are substituted.

14. A process according to claim 10 in which the N-alkoxymethylated poly-ε-caprolactam is a partially depolymerized N-alkoxymethylated poly-ε-caprolactam having a K-value of about 30 to 35, an intrinsic viscosity of about 0.15 to 0.21, and in which about 20 to 50 percent of the carbonamide groups thereof are substituted.

15. A process according to claim 10 in which the light sensitive compound is a bichromate.

16. A process according to claim 10 in which the light sensitive compound is a diazo borofluoride.

17. A process according to claim 10 in which the light sensitive compound is an aryl azido compound.

18. A process according to claim 10 in which the light sensitive compound has the formula

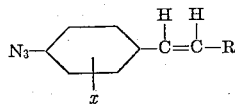

in which R is selected from the group consisting of aliphatic, aromatic and heterocyclic radicals and $x$ is selected from the group consisting of hydrogen, a water-soluble alkali salt-forming group, and —$SO_2$—NH—$R_1$, in which $R_1$ is selected from the group consisting of aryl and substituted aryl.

19. As a new article of manufacture a screen printing stencil which comprises a porous base material, said material being image-wise coated with a resist comprising a hardened N-alkoxymethylated poly-ε-caprolactam.

References Cited in the file of this patent

UNITED STATES PATENTS

| | | |
|---|---|---|
| 2,299,839 | McQueen | Oct. 27, 1942 |
| 2,412,993 | Larchar | Dec. 24, 1946 |
| 2,430,866 | Foster et al. | Nov. 18, 1947 |
| 2,443,450 | Graham et al. | June 15, 1948 |
| 2,972,540 | Saner et al. | Feb. 21, 1961 |

FOREIGN PATENTS

| | | |
|---|---|---|
| 790,131 | Great Britain | Feb. 5, 1958 |